United States Patent

Ohta et al.

[11] Patent Number: 5,377,523
[45] Date of Patent: Jan. 3, 1995

[54] ACCELERATION SENSOR SUITABLE FOR SELF-CHECKING AND A SELF-CHECKING CIRCUIT THEREFORE

[75] Inventors: Fumio Ohta, Yokkaichi; Nobuo Tanaka, Tokyo; Yoshinao Mukasa, Tokyo; Akira Gohkura, Tokyo, all of Japan

[73] Assignee: Mitsubishi Petrochemical Co., Ltd., Tokyo, Japan

[21] Appl. No.: 914,866

[22] Filed: Jul. 16, 1992

[30] Foreign Application Priority Data

Jul. 19, 1991 [JP] Japan .................. 3-179125

[51] Int. Cl.⁶ .................. G01P 15/05; G01P 21/00
[52] U.S. Cl. .................. 73/1 D; 73/517 AV
[58] Field of Search ........ 73/1 D, 1 B, 1 DV, 517 R, 73/517 AV

[56] References Cited

U.S. PATENT DOCUMENTS

| | | | |
|---|---|---|---|
| 2,808,524 | 10/1957 | Feinstein | 73/517 R X |
| 3,120,622 | 2/1964 | Dranetz et al. | 73/517 R X |
| 3,390,286 | 6/1968 | Gradin et al. | 73/517 R X |
| 3,911,391 | 10/1975 | Held et al. | 340/669 X |
| 4,586,377 | 5/1986 | Schmid | 73/1 D X |
| 4,873,452 | 10/1989 | Moroto et al. | 307/10.1 |
| 4,900,919 | 2/1990 | Twerdochlib | 73/517 R X |
| 4,950,914 | 8/1990 | Kurihara et al. | 307/10.1 |
| 5,060,504 | 10/1991 | White et al. | 73/1 D |
| 5,130,600 | 7/1992 | Tomita et al. | 73/654 X |
| 5,253,510 | 10/1993 | Allen et al. | 73/1 D |

FOREIGN PATENT DOCUMENTS

| | | | |
|---|---|---|---|
| 401669 | 12/1990 | European Pat. Off. . | |
| 24154 | 2/1987 | Japan | 73/517 R |
| 287470 | 11/1989 | Japan | 73/517 R |
| 287075 | 12/1991 | Japan | 73/517 R |
| 361723 | 10/1976 | U.S.S.R. | 73/517 R |
| 998958 | 2/1983 | U.S.S.R. | 73/1 D |

OTHER PUBLICATIONS

"High Sensitivity Piezoelcetic Accelerometer"; *Review of Scientific Instruments*; vol. 46, No. 5, pp.554–558, May 1975; A.C. Tims et al.

*Patent Abstracts of Japan*: vol. 14199; Crp P1040 published Apr. 23, 1990; Abstract of Japanese patent No. 2–40566.

*Primary Examiner*—Tom Noland
*Attorney, Agent, or Firm*—David O'Reilly

[57] ABSTRACT

This invention relates to an acceleration sensor device suitable for self-checking while a vehicle is being driven and a self-checking circuit therefor. An acceleration sensor device for self-checking while driving is comprised of a planar vibrator having a piezoelectric area and a non-piezoelectric area and a plurality of first electrodes provided on an upper face of the piezoelectric area of the planar vibrator. At least one second electrode is provided on an upper face of the non-piezoelectric area of the planar vibrator, and a third electrode is provided on the lower face of the planar vibrator. Inputs to the self-checking circuits provide an output that represents the operating state of the acceleration sensor.

7 Claims, 4 Drawing Sheets

SIGNAL S0

SIGNAL S1

SIGNAL S5

AMPLIFIER 13 OUTPUT

SIGNAL SIG

SIGNAL S4

SIGNAL S6

SIGNAL S7

SIGNAL S0

SIGNAL S1

SIGNAL S5

SIGNAL S2

SIGNAL S4

SIGNAL S6

SIGNAL S7

ACCELERATION SENSOR SUITABLE FOR SELF-CHECKING AND A SELF-CHECKING CIRCUIT THEREFORE

FIELD OF THE INVENTION

This invention relates to an acceleration sensor system used for an air bag safety system, and more particularly an acceleration sensor device suitable for self checking (diagnostic) and an acceleration sensor system having a self checking (diagnostic) function.

BACKGROUND OF THE INVENTION

Heretofore, an acceleration sensor system used for an air bag safety system generally comprises an acceleration a sensor device generating an electric signal responsive to variation of an applied acceleration force and a circuit which amplifies and integrates an output signal of the acceleration sensor device. The system actuates an air bag when the an integrated value exceeds a predetermined value. Abnormal operation of the acceleration sensor system directly concerns human life, therefore an operation check of the acceleration sensor system is inevitable. An Acceleration sensor system having a self checking circuit for operation check is disclosed in U.S. Pat. No. 3,911,391. In this prior art, with the ignition switch ON in the vehicle, the system operation is checked. Concretely, a pulses generating circuit continuously generates two kinds of check pulses of different levels in response to ignition switch ON of a vehicle. An integrator integrates the output value of a piezoelectric sensor system for these pulses and a comparator compares each of the integrated results corresponding to the check pulses with a predetermined value. Level of the check pulses are set, if the sensor system operates normally, to exceed and not to exceed the predetermined value, respectively. In this prior art, an ignition element of the air bag is isolated during the checking to avoid actuating the air bag by the check pulse and if the checking result is normal, the ignition element is electrically connected to the sensor system. Therefore, this system can not make a check after the vehicle starts moving.

SUMMARY OF THE INVENTION

It is an object of the present invention to provide an acceleration sensor device suitable for self-checking during driving.

Other object of this invention is to provide self checking circuit suitable for an acceleration sensor device.

Another object of this invention is to provide an acceleration sensor system which detects the acceleration force applied to the vehicle and self checking operation during driving of the vehicle.

According to this invention, an acceleration sensor device suitable for self checking during driving comprises a planar vibrator consisting of a piezoelectric area having piezoelectricity and a non-piezoelectric area having no piezoelectricity, the first of plurality electrodes provided on an upper: face of the piezoelectric area of the vibrator, at least one second electrode provided on upper face of the non-piezoelectric area of the vibrator, and a third electrode provided on a lower face of the vibrator.

Moreover according to this invention, a self-checking circuit of an acceleration sensor suitable for acceleration sensor system comprises a planar vibrator consisting of a piezoelectric area having piezoelectricity and a non-piezoelectric area having no piezoelectricity, the first of a plurality of electrodes provided on an upper face of the piezoelectric area of the vibrator, at least one second electrode provided on upper face of the non-piezoelectric area of the vibrator, a third electrode provided on the lower face of the vibrator, a self-checking circuit for an acceleration sensor device generating an acceleration detecting signal corresponding to the applied acceleration force acting on the vibrator from at least one of the first electrodes, and an oscillation circuit that supplys a self-checking signal having a predetermined frequency and voltage to the second electrode. The first checking circuit generates a first checking signal representing the compared result by comparing a frequency component of the self checking signal included in the acceleration detecting signal with a predetermined first value. A first adder superimposes a direct current signal having predetermined voltage on the acceleration detecting signal. A filter circuit removing the frequency component of the self-checking signal from the output signal of the first adder and outputs an acceleration signal representing an acceleration force applied to the acceleration device. A second checking circuit compares the acceleration signal with a predetermined second value and generates a compared result as a second checking signal. A third checking circuit generates a checking result signal representing an operation state of the acceleration sensor and the first and second checking circuits from the first and the second checking signals.

Further according to this invention, an acceleration sensor system is obtained, which comprises a planar vibrator consisting of a piezoelectric area having piezoelectricity and a non-piezoelectric area having no piezoelectricity. The first of a plurality electrodes provided on an upper face of the piezoelectric area of the vibrator and at least one second electrode is provided on an upper face of said non-piezoelectric area of said vibrator. A third electrode is provided on a lower face of said vibrator, and an oscillation circuit that supplys a self-checking signal having a predetermined frequency and voltage to the second electrode, A first checking circuit generates a first checking signal representing a compared result by comparing frequency component of said self-checking signal in the acceleration detecting signal with a predetermined first value. A first adder for adding a direct current signal having predetermined voltage on the acceleration detect signal. A filter circuit removes the frequency component of the self-checking signal from output signal of the first adder, and outputs an acceleration signal representing an acceleration force applied to the acceleration device. A second checking circuit compares the acceleration signal with predetermined second value and generates compared result as a second checking signal. A third checking circuit generates a checking result signal representing operation state of the acceleration sensor, and the first and the second checking circuits from the first and the second checking signals.

BRIEF DESCRIPTION OF THE DRAWINGS

These and other objects and novel features of the invention will be better understood upon consideration of the following detailed description and the accompanying drawings in which.

DETAILED DESCRIPTION OF THE PREFERRED EMBODIMENT

Figure 1:
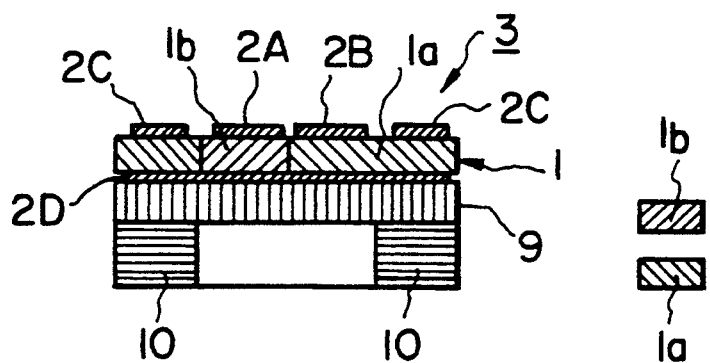
FIG. 1 is a cross-sectional view of an illustrative embodiment of the present invention for an acceleration sensor device.
Figure 2A:
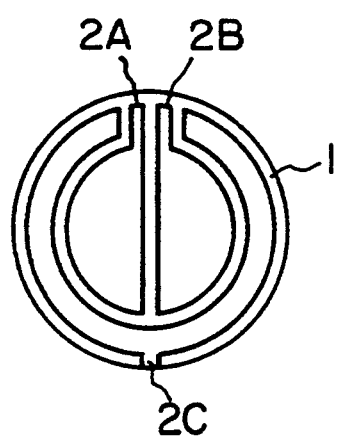
FIGS. 2a and 2b are plan views showing the arrangement of the electrodes of the acceleration sensor element shown in FIG. 1.
Figure 2B:
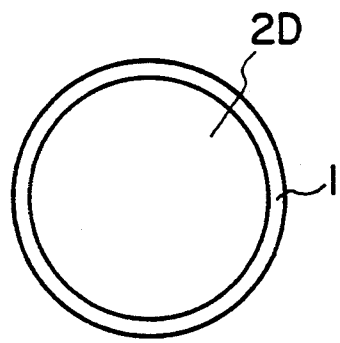
Figure 3:
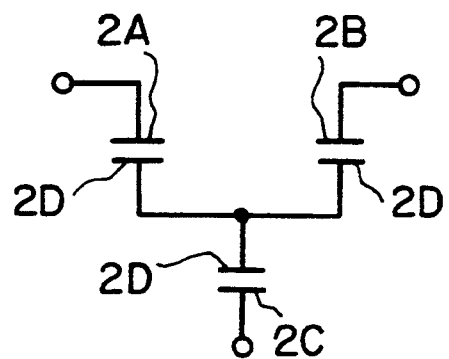
FIG. 3 shows an equivalent circuit of the acceleration sensor element shown in FIG. 1.

As shown in FIG. 1 a vibrator 1 of an acceleration sensor device 3 according to present invention consists of piezoelectric material which has a piezoelectric area 1a and non-piezoelectric area 1b. This type vibrator 1 can be realized by applying an electric field to the area 1a to be the piezoelectric area. Vibrator 1 has a checking electrode 2A, a detecting electrode 2B, a common electrode 2C and an intermediate electrode 2D. FIGS. 2a and 2b show the arrangement of the electrodes 2A-2D. As shown in the Figs., the shape of vibrator 1 is like a disc and the electrodes 2A-2C are distributed on the upper face of the vibrator 1 and the electrode 2D covers almost of all of the lower face of the vibrator 1. An area covered with the checking electrode 2A of the vibrator 1 is not polarized and has no piezoelectric characteristic. In FIG. 1, an acceleration sensor device 3 has backboard 9 as a protecting member and a supporting frame 10 for supporting the backboard 9. The supporting frame 10 has a ring shape and supports at the border part to allow free displacement of central part of the vibrator 1. FIG. 3 shows an equivalent circuit of the vibrator 1. As a result, the acceleration sensor device can cancel a pyroelectric voltage and eliminates any influence to the output signal due to temperature variation. As explained later, the checking electrode 2A is used for checking the sensor device, the detecting electrode 2B is used for picking up an electric signal proportional to an applied acceleration force, the common electrode 2C is used for signal ground.

Figure 4:
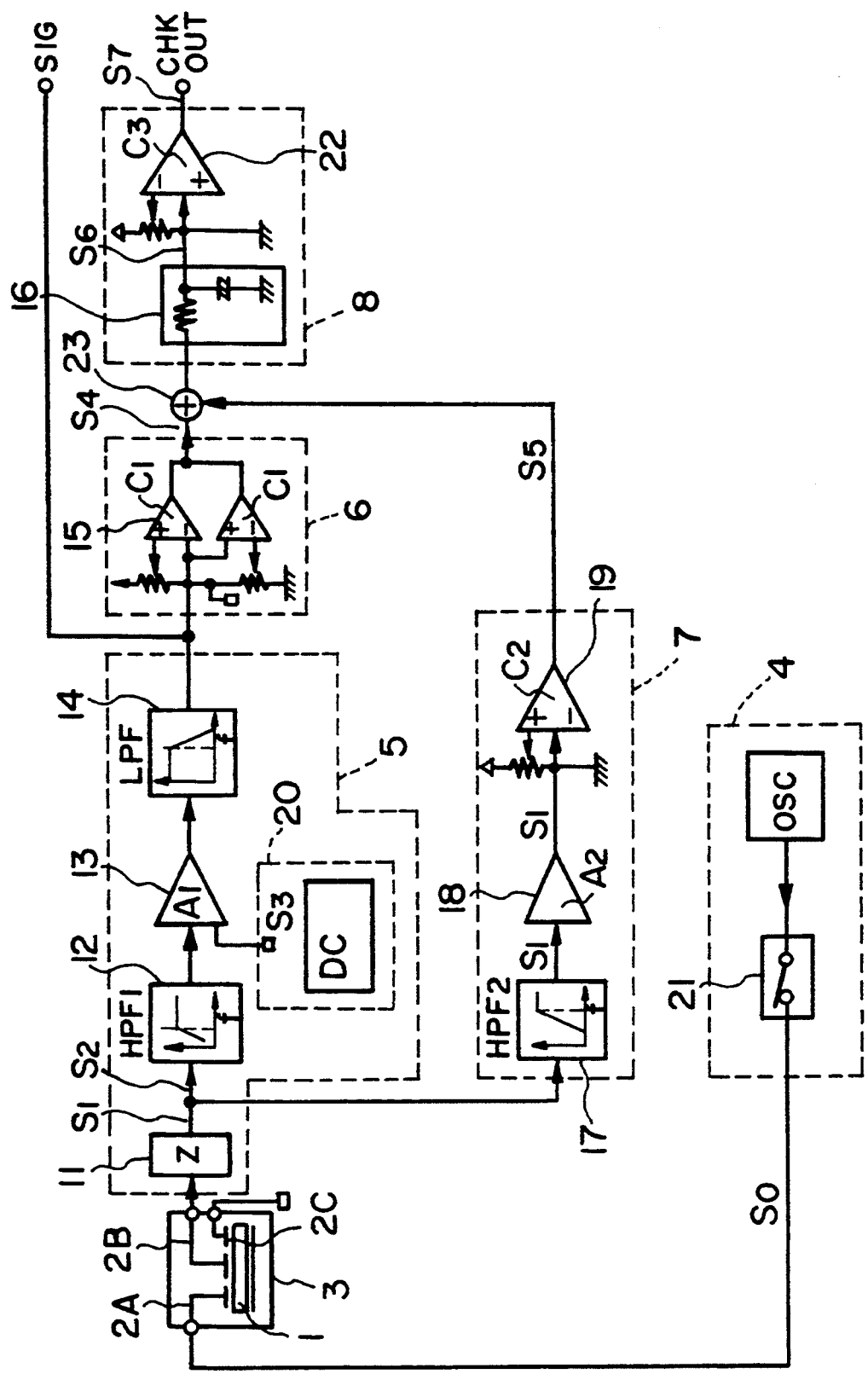
FIG. 4 is a block diagram showing construction of an acceleration sensor system having a self-checking function according to this invention.

Referring to FIG. 4, an acceleration sensor system having a self-checking function is explained. This acceleration sensor system comprises an amplifier circuit 5, an offset checking circuit 6, an oscillator circuit 4, an oscillating signal checking circuit 7, and an abnormal checking circuit 8 in addition to the acceleration sensor device 3.

The oscillator circuit 4 generates the checking signal $S_0$ having a predetermined frequency and supply it to electrode 2A of the sensor device 3. The frequency of the checking signal $S_0$ is preferable a frequency such as 5 KHz which is easily separated from the normal generating frequency zone (1—1 KHz) of vibration or acceleration during normal driving of a vehicle. Oscillator circuit 4 has switch 21 for switching the supply of checking signal $S_0$ for intermittent self checking. If electrical connection of acceleration sensor device 3 is normal, an oscillating signal $S_1$ having a voltage which is proportional to the voltage of the checking signal $S_0$ is produced from the detection electrode 2B by capacitance coupling shown in equivalent circuit of FIG. 3. Therefore, detecting electrode 2B produces an added signal ($S_1+S_2$) which is a superimposed signal of the oscillating signal $S_1$ and the acceleration signal $S_2$ which is proportional to accelerated force applied to the vibrator 1.

The amplifier circuit 5 is connected to detecting electrode 2B of the acceleration sensor device 3 and generates an acceleration signal which represents an acceleration force applied to the acceleration sensor device 3. In the amplifier circuit 5, an impedance transducer 11 matches an output impedance of the detecting electrode 2A and an input impedance of first and second highpass filters 12 and 17. The first highpass filter 12 has a low cut-off frequency such as 1 Hz, and eliminates a low zone variation due to the pyroelectric effect of the acceleration sensor device 3 and long periodic variation of direct current voltage of the impedance transducer 11. The first amplifier 13 amplifies the added signal ($S_1+S_2$) and adds an offset signal $S_3$ generated by an offset signal generator 20 to the amplified added signal ($S_1+S_2$). The offset signal $S_3$ is a predetermined direct current voltage signal. A low pass filter 14 eliminates the frequency component of oscillating signal $S_1$ from the amplified added signal and the outputs acceleration signal SIG.

Oscillating signal checking circuit 7 extracts a frequency component of the oscillating signal $S_1$ from impedance transduced added signal ($S_1+S_2$) by the impedance transducer 11 in the amplifier circuit 5 and generates an oscillation checking signal $S_5$ having predetermined levels which represent normal and abnormal states. In the oscillating signal checking circuit 7, a highpass filter 17 has a cut off frequency such as 1 KHz, and eliminates the vibration frequency component (1—1 KHz), produced by normally driving, from the output signal of the impedance transducer 11 and extracts the oscillating signal $S_1$. A second amplifier 18 amplifies oscillating signal $S_1$ extracted by highpass filter 17. Amplified oscillating signal $S_1$ is compared with a predetermined reference voltage by a second comparator circuit 19, and transduced into a rectangular wave signal according to the comparison result. Now assume that the rectangular wave signal has a high level during the oscillating signal exceeds the reference voltage. This rectangularly transduced wave oscillating signal $S_1$ is supplied to one of input terminals of an adder 23 as an oscillation checking signal $S_5$.

A first comparator circuit 15 as an offset checking circuit 6 compares the acceleration detecting signal from the amplifier circuit 5 with predetermined normal voltage range, according to whether the acceleration detecting signal is within the normal range or not, and generates an offset checking signal $S_4$ having different levels. The offset checking signal $S_4$ is supplied to the other input terminal of the adder 23. The adder 23 adds the offset checking signal $S_4$ and the oscillation checking signal $S_5$, and supplies a composite checking signal $S_6$ to the abnormal checking circuit 8.

The abnormal checking circuit 8 receives the composite checking signal $S_6$, generates a self-checking signal $S_7$ representative of an operation state of the whole acceleration system. In the abnormal checking circuit 8, integral circuit 16 integrates the checking signal $S_6$ for a predetermined period, and supplies the integrated values to a third comparator circuit 22. The third comparator circuit 22 compares integrated values with a reference value, and generates a self-checking signal representing normal or not operation of the whole operation of the acceleration sensor system.

Figure 5A:
FIG. 5a to 5h are graphs of waveforms representative of normal operation in FIG. 4.
Figure 5B:
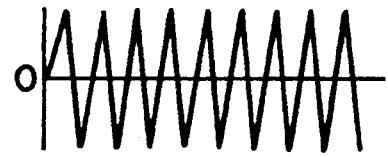

Next, referring to FIGS. 5a–5h and 6a–6g, self-checking operation of acceleration sensor system shown in FIG. 4 is explained. FIGS. 5a–5h show wave forms in the normal state. The oscillator circuit 4 outputs the checking signal $S_0$ of predetermined frequency when switch 21 is closed (FIG. 5a). The checking signal $S_0$ is supplied to the checking electrode 2A of the acceleration sensor device 3. In response to the checking signal $S_0$, the oscillating signal $S_1$ whose voltage is proportional to voltage of the checking signal $S_0$ is obtained from the detected electrode 2B of acceleration sensor device 3 (FIG. 5b) while, the acceleration signal $S_2$ represents acceleration force which is applied to vibrator 1 is output from the checking electrode 2B regardless of existence of checking signal $S_0$. Namely, during self-checking, the added signal of oscillating signal $S_1$ and acceleration signal $S_2$ is output. The added signal $(S_1+S_2)$ is impedance transduced by the impedance transducer 11 of amplifier circuit 5, and is supplied to the first and second highpass filters 12 and 17.

Figure 5C:
Figure 5D:
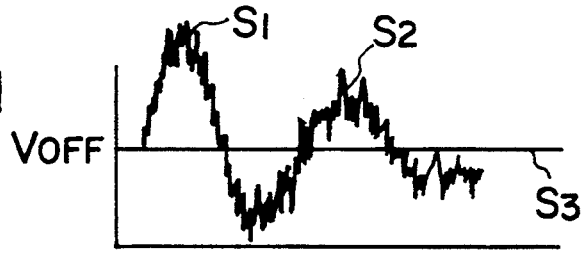
Figure 5E:
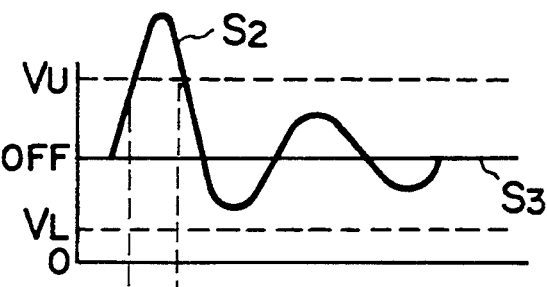

The first highpass filter 12 eliminates the direct current voltage due to the impedance transducer 11 and small variation due to a pyroelectric effect and feeds an output to one terminal of the amplifier 13. An offset signal of Voltage $V_{OFF}$ from the offset signal generator 20 is fed to the other terminal of the amplifier 13. The amplifier 13 outputs a superimposed signal of the added signal $(S_1+S_2)$ and the offset signal $S_3$ (FIG. 5d). The lowpass filter 14 eliminates oscillating signal $S_1$ and outputs acceleration signal SIG (FIG. 5e).

Figure 5F:
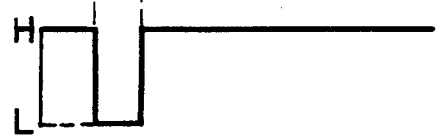

This acceleration signal SIG is fed to the offset checking circuit 6 constituted of the first comparator circuit 15. This first comparator circuit 15 compares the acceleration signal SIG with an upper limit value $V_u$ and a lower limit value $V_L$ and if a level of the acceleration signal SIG exceeds the range between upper limit value $V_u$ and lower limit value $V_L$, generates a low level signal L, otherwise it generates a high level signal H (FIG. 5f).

On the other hand, the added signal $(S_1+S_2)$ is fed to the second highpass filter 17 of the oscillating signal checking circuit 7 via the impedance transducer 11. The second highpass filter 17 eliminates the acceleration signal $S_2$ from the added signal $(S_1+S_2)$ and extracts a frequency component of oscillating signal $S_1$. The oscillating signal $S_1$ in added signal $(S_1+S_2)$ is amplified in the amplifier 18 and fed to the second comparator 19. The second comparator 19 transduces a triangular wave into a rectangular wave and outputs the oscillation checking signal $S_5$ (FIG. 5c).

Figure 5G:
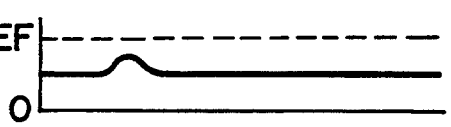
Figure 5H:
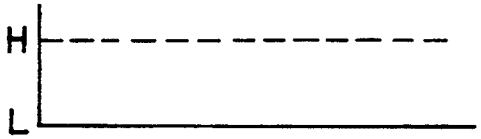

Adder 23 adds offset checking signal $S_4$ and oscillation checking signal $S_5$ and feeds added checking signal to abnormal checking circuit 8. In abnormal checking circuit 8, added checking signal is integrated by a predetermined time by integral circuit 16 and integral circuit 16 feeds integral checking signal to third comparator circuit 22 (FIG. 5g). Third comparator circuit 22 compares the integral checking signal with reference level $V_{REF}$ (FIG. 5g) and outputs self checking signal $S_7$ (FIG. 5h) which is at a high level H when integral checking signal exceeds reference level $V_{REF}$ and low level L in other cases.

Explanation of Operation in Abnormal State

Next, referring to FIGS. 6a–6g, the self-checking operation in an abnormal state is explained.

1. When electrical connection of acceleration sensor device 3 is abnormal, namely, a scrape (exfoliate) or a broken conductive line occurs.

Figure 6A:
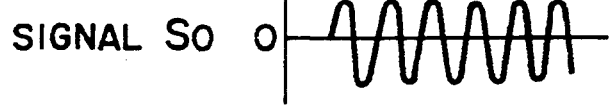
FIG. 6a to 6g are graphs of waveforms representative of abnormal operation in FIG. 4.
Figure 6B:
Figure 6C:
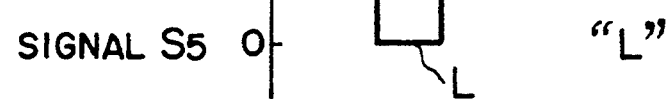
Figure 6D:
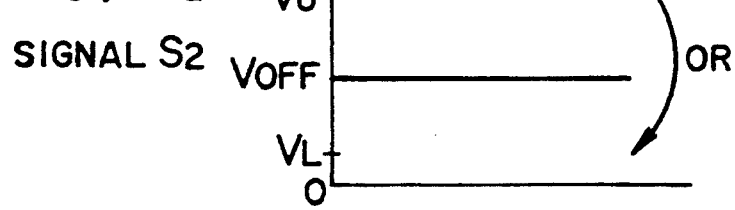
Figure 6E:
Figure 6F:
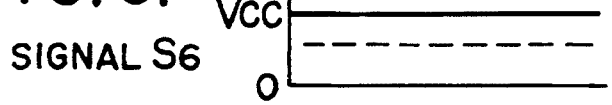
Figure 6G:

When checking electrode 2A and detecting electrode 2B are broken, no oscillation signal $S_0$ (FIG. 6a) is obtained from detecting electrode 2B even if checking signal $S_0$ is added to checking electrode 2A (FIG. 6b). Therefore, oscillation checking signal $S_5$ output from second comparator circuit 19 is at a high level (FIG. 6c). Adder 23 receives high level signal of oscillation checking signal $S_5$ and generates high level adding Signal (FIG. 6f). Further, integral circuit 16 of abnormal checking circuit 8 generates a high level self-checking signal (FIG. 6g). Comparator circuit 22 receives a high level integral checking signal on an inverting input terminal, and generates a high level self checking signal representing abnormal. An abnormal in either of oscillator circuit 4, impedance transducer 11, highpass filter 17, oscillating signal checking circuit 7 can be detected similarly.

2. When either of offset signal generator 20, amplifier 13, highpass filter 12, low pass filter 14 are abnormal.

In this case, the offset voltage is abnormal and the offset checking circuit can detect this abnormal. In comparator circuit 15 consisting of offset checking circuit 6, upper limit value $V_u$, and lower limit value $V_l$ are set from reference offset voltage which is corresponding to no acceleration (OG) state in the acceleration sensor by considering a normal acceleration signal level (FIG. 6d). $V_{cc}$ is the driving voltage. And if the acceleration signal level exceeds this upper limit value $V_u$ or lower limit value $V_L$, offset checking circuit 6 generates a low level offset checking signal $S_4$ (FIG. 6g). In the other case offset checking circuit 6 generates high level offset checking signal $S_4$ (FIG. 6e). The abnormal checking circuit 8 generates a high level self-checking signal $S_7$ showing an abnormal for detecting abnormal (FIG. 6g).

As explained above, in this invention, an acceleration sensor device capable of self-checking during driving is obtained. And it is possible to check both of the acceleration sensor element and operation of self-checking circuit itself by oscillation checking circuit and offset checking circuit.

It will be understood that the present invention is not to be limited to the specific embodiments herein before discussed but extends to all modifications thereof which will occur to those skilled in the art upon consideration of the general disclosure, its illustrative details and the scope of the claims appended hereto.

The above description of the preferred embodiment of this invention and the preferred dimensions thereof are given by way of example only, and numerous modifications can be made by those familiar with acceleration sensors without departing from the scope of the invention as defined in the claims. Indeed, the suggested dimensions are preferred only for the acceleration sensor indicated, and these dimensions should be modified accordingly to accommodate the piezoelectric device of different dimensions or configurations.

The embodiments of the invention in which an exclusive property or privilege is claimed are defined as follows:

1. A self-checking circuit of an acceleration sensor device comprising planar vibrator means consisting of a piezoelectric area having piezoelectricity and a non-piezoelectric area having no piezoelectricity;

a plurality of first electrode means provided on an upper face of said piezoelectric area of said vibrator means;

at least one second electrode means provided on an upper face of said non-piezoelectric area of said planar vibrator means;

a third electrode means provided on a lower face of said vibrator means;

a self-checking circuit for said acceleration sensor device generating an acceleration detecting signal corresponding to an applied acceleration force acting on said vibrator means from at least one of said first electrode means comprising;

oscillation circuit means supplying a self-checking signal having a predetermined frequency and voltage to said at least one second electrode means, first checking circuit means generating a first checking signal representing a compared result of comparing a frequency component of said self-checking signal included in said acceleration detecting signal with said predetermined first value, first adder means for superimposing a direct current signal of predetermined voltage to said acceleration detecting signal, filter circuit means outputting an acceleration signal representing an acceleration force applied to said acceleration sensor device eliminating said frequency component of said self-checking signal from an output signal of said first adder means, second checking circuit means generating a compared result as a checking signal comparing said acceleration signal with a predetermined second value, third circuit means generating a checking result signal representing an operational state of said acceleration sensor device, from said first and second checking signals.

2. The self-checking circuit of an acceleration sensor device as claimed in claim 1 wherein said third circuit means comprises;

a second adder outputting an added signal adding said first and second checking signals, an integral circuit outputting an integration signal integrating said added signal for a predetermined period and, a comparator circuit outputting a compared result as said checking result signal by comparing said integrated signal with a predetermined third value.

3. The self-checking circuit of acceleration sensor device claimed in claim 1 in which said oscillating circuit means has a switch means for feeding said self-checking signal for a predetermined period.

4. An acceleration sensor system comprising an acceleration sensor device including planar vibrator means consisting of a piezoelectric area having piezoelectricity and a non-piezoelectric area having no piezoelectricity, a plurality of first electrode means provided on an upper face of said piezoelectric area of said vibrator means, at least one second electrode means provided on an upper face of said non-piezoelectric non-piezoelectric area, and a third electrode means provided on a lower face of said vibrator means;

oscillation circuit means supplying a self-checking signal having a predetermined frequency and voltage to said at least one second electrode means, first checking circuit means generating a first checking signal representing a compared result by comparing a frequency component of said self-checking signal included in an acceleration detecting signal with a predetermined first value, first adder means for superimposing a direct current signal of predetermined voltage on said acceleration detecting signal, filter circuit means outputting an acceleration signal representing acceleration force applied to said acceleration device eliminating a frequency component of said self-checking signal from an output signal of said first adder means;

second checking circuit means generating a result as a checking signal by comparing said acceleration signal with a predetermined second value, third circuit means generating a checking result signal representing an operational state of said acceleration sensor from said first and second checking signals.

5. An acceleration sensing device self-checking circuit comprising; a planar vibrating means, said planar vibrating means having a piezoelectric area, a non-piezoelectric area, an acceleration detecting portion for generating a signal from an applied acceleration force, and an input portion for applying a checking signal to self-check said piezoelectric and non-piezoelectric areas;

a plurality of output electrode means on a first face of said piezoelectric area of said planar vibrating means to output an acceleration detection signal; at least one self-checking electrode means on said first face of said non-piezoelectric area of said planar vibrating means;

an additional electrode means on another face of said planar vibrator means opposite said plurality of output electrode means;

self-checking circuit means for generating said acceleration detection signal from an acceleration force applied to at least one of said plurality of output electrode means on said first face of said piezoelectric area;

oscillating circuit means providing a self-checking signal at a predetermined frequency and voltage to said at least one self-checking electrode means;

first checking circuit means generating a first checking signal from a compared result of comparing a frequency component of said self-checking signal with a predetermined first signal value;

first adding means for superimposing a direct current signal of predetermined voltage on said acceleration detection signal;

filter circuit means for eliminating said frequency component of said self-checking signal from an output of said first adding means to provide an acceleration output signal representing an acceleration force applied to said acceleration sensor;

second checking circuit means comparing said acceleration output signal with a predetermined second signal value and generating a checking signal; and third circuit means for generating a second checking result signal from said first and second checking signals representing an operational state of said acceleration sensing device.

6. The circuit according to claim 5 in which said third circuit means for generating a second checking result signal comprises; second adding means for adding said first and second checking signals, integrating circuit means integrating an output from said second adding means; and comparator means for comparing an output of said integrating circuit means with a predetermined third signal.

7. The circuit according to claim 5 in which said oscillating circuit means includes switch means for applying said self-checking circuit for a predetermined period.

* * * * *